US012670070B2

(12) United States Patent
Sharon et al.

(10) Patent No.: US 12,670,070 B2
(45) Date of Patent: Jun. 30, 2026

(54) LOW COMPLEXITY BIT-ERROR-RATE ESTIMATION FOR ENCODED FOGGY-FINE PROGRAMMING

(71) Applicant: Sandisk Technologies, Inc., Milpitas, CA (US)

(72) Inventors: Eran Sharon, Rishon Lezion (IS); Jack Frayer, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 71 days.

(21) Appl. No.: 18/968,099

(22) Filed: Dec. 4, 2024

(65) Prior Publication Data

US 2026/0154157 A1 Jun. 4, 2026

(51) Int. Cl.
*G06F 11/10* (2006.01)
(52) U.S. Cl.
CPC ................................. *G06F 11/1076* (2013.01)
(58) Field of Classification Search
CPC .................................................. G06F 11/1076
See application file for complete search history.

(56) References Cited

U.S. PATENT DOCUMENTS

| | | | | |
|---|---|---|---|---|
| 9,070,472 | B2 | 6/2015 | Alrod | |
| 9,946,468 | B2 | 4/2018 | Conley | |
| 11,269,725 | B2 | 3/2022 | Sharon | |
| 11,456,038 | B2 | 9/2022 | Nguyen | |
| 11,650,756 | B2 | 5/2023 | Alrod | |
| 2022/0206710 | A1* | 6/2022 | Alrod | .................... G06F 11/108 |
| 2022/0230685 | A1* | 7/2022 | Alrod | .................. G11C 11/5671 |
| 2024/0212767 | A1 | 6/2024 | Prakash | |

* cited by examiner

*Primary Examiner* — Thien Nguyen
(74) *Attorney, Agent, or Firm* — Arlene Neal; NEAL BLIBO LLC

(57) ABSTRACT

A memory die estimates a bit-error-rate (BER) for an encoded foggy program operation and uses the BER to determine whether to decode foggy programmed data on the memory die for a fine programming operation. A controller on the die receives data from a storage device and generates parity page(s) based on the data. The controller performs a foggy program operation to write the data to memory cells in a block. The controller separates states in a memory cell into categories based on a value of a parity page associated with a state. The controller also performs soft bit sensing operations and estimates a BER for the memory cell based on the soft bit sensing operations. Based on the BER, the memory controller performs on-die decoding of the foggy programmed data with the parity page(s) or transfers the foggy programmed data to the storage device for decoding.

20 Claims, 11 Drawing Sheets

| EVENT | GREEN | PARITY | RECOVERED BITS |
|---|---|---|---|
| 0 | 1111 | E | 1111 |
| 1 | 1111 | O | 0111 |
| PD1 | 0111 | E | 1111 |
| 0 | 0111 | O | 0111 |
| 2 | 0101 | E | 1100 |
| PD1 | 0101 | O | 0111 |
| 1 | 1101 | E | 1100 |
| 2 | 1101 | O | 0100 |
| 0 | 1100 | E | 1100 |
| 1 | 1100 | O | 0101 |
| PD1 | 0100 | E | 1100 |
| 0 | 0100 | O | 0100 |
| 2 | 0000 | E | 0011 |
| PD1 | 0000 | O | 0100 |
| 1 | 0001 | E | 0011 |
| 2 | 0001 | O | 0100 |
| 0 | 0011 | E | 0011 |
| 1 | 0011 | O | 0010 |
| PD1 | 0010 | E | 0011 |
| 0 | 0010 | O | 0010 |
| 2 | 0110 | E | 1010 |
| PD1 | 0110 | O | 0010 |
| 1 | 1110 | E | 1010 |
| 2 | 1110 | O | 1000 |
| 0 | 1010 | E | 1010 |
| 1 | 1010 | O | 1000 |
| PD1 | 1000 | E | 1010 |
| 0 | 1000 | O | 1000 |
| PD2 | 1001 | E | 1010 |
| PD2 | 1001 | O | 1001 |
| PD2 | 1011 | E | 1010 |
| PD2 | 1011 | O | 1000 |

GREEN BIT TABLE 704

| EVENT | RED | PARITY | RECOVERED BITS |
|---|---|---|---|
| 2 | 1111 | E | 0101 |
| 3 | 1111 | O | 1101 |
| 1 | 0111 | E | 0101 |
| 2 | 0111 | O | 1101 |
| 0 | 0101 | E | 0101 |
| 1 | 0101 | O | 1101 |
| PD1 | 1101 | E | 0101 |
| 0 | 1101 | O | 1101 |
| 2 | 1100 | E | 0000 |
| PD1 | 1100 | O | 1101 |
| 1 | 0100 | E | 0000 |
| 2 | 0100 | O | 0001 |
| 0 | 0000 | E | 0000 |
| 1 | 0000 | O | 0001 |
| PD1 | 0001 | E | 0000 |
| 0 | 0001 | O | 0001 |
| 2 | 0011 | E | 0110 |
| PD1 | 0011 | O | 0001 |
| 1 | 0010 | E | 0110 |
| 2 | 0010 | O | 1110 |
| 0 | 0110 | E | 0110 |
| 1 | 0110 | O | 1110 |
| PD1 | 1110 | E | 0110 |
| 0 | 1110 | O | 1110 |
| 2 | 1010 | E | 1001 |
| PD1 | 1010 | O | 1110 |
| 1 | 1000 | E | 1001 |
| 2 | 1000 | O | 1011 |
| 0 | 1001 | E | 1001 |
| 1 | 1001 | O | 1011 |
| PD1 | 1011 | E | 1001 |
| 0 | 1011 | O | 1011 |

RED BIT TABLE 706

ENCODED RECOVERY TABLE

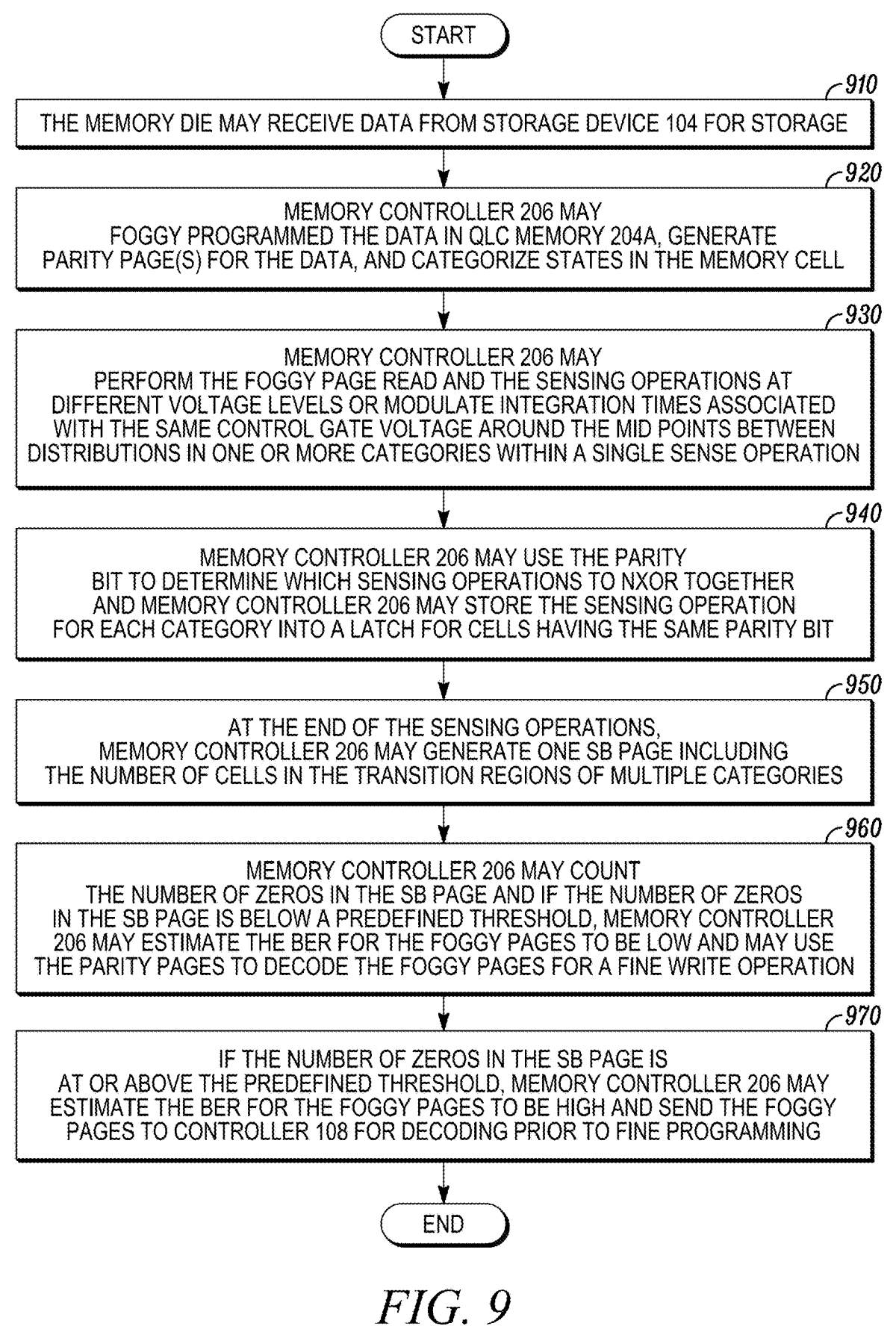

START

910

THE MEMORY DIE MAY RECEIVE DATA FROM STORAGE DEVICE 104 FOR STORAGE

920

MEMORY CONTROLLER 206 MAY
FOGGY PROGRAMMED THE DATA IN QLC MEMORY 204A, GENERATE
PARITY PAGE(S) FOR THE DATA, AND CATEGORIZE STATES IN THE MEMORY CELL

930

MEMORY CONTROLLER 206 MAY
PERFORM THE FOGGY PAGE READ AND THE SENSING OPERATIONS AT
DIFFERENT VOLTAGE LEVELS OR MODULATE INTEGRATION TIMES ASSOCIATED
WITH THE SAME CONTROL GATE VOLTAGE AROUND THE MID POINTS BETWEEN
DISTRIBUTIONS IN ONE OR MORE CATEGORIES WITHIN A SINGLE SENSE OPERATION

940

MEMORY CONTROLLER 206 MAY USE THE PARITY
BIT TO DETERMINE WHICH SENSING OPERATIONS TO NXOR TOGETHER
AND MEMORY CONTROLLER 206 MAY STORE THE SENSING OPERATION
FOR EACH CATEGORY INTO A LATCH FOR CELLS HAVING THE SAME PARITY BIT

950

AT THE END OF THE SENSING OPERATIONS,
MEMORY CONTROLLER 206 MAY GENERATE ONE SB PAGE INCLUDING
THE NUMBER OF CELLS IN THE TRANSITION REGIONS OF MULTIPLE CATEGORIES

960

MEMORY CONTROLLER 206 MAY COUNT
THE NUMBER OF ZEROS IN THE SB PAGE AND IF THE NUMBER OF ZEROS
IN THE SB PAGE IS BELOW A PREDEFINED THRESHOLD, MEMORY CONTROLLER
206 MAY ESTIMATE THE BER FOR THE FOGGY PAGES TO BE LOW AND MAY USE
THE PARITY PAGES TO DECODE THE FOGGY PAGES FOR A FINE WRITE OPERATION

970

IF THE NUMBER OF ZEROS IN THE SB PAGE IS
AT OR ABOVE THE PREDEFINED THRESHOLD, MEMORY CONTROLLER 206 MAY
ESTIMATE THE BER FOR THE FOGGY PAGES TO BE HIGH AND SEND THE FOGGY
PAGES TO CONTROLLER 108 FOR DECODING PRIOR TO FINE PROGRAMMING

END

*FIG. 9*

LOW COMPLEXITY BIT-ERROR-RATE ESTIMATION FOR ENCODED FOGGY-FINE PROGRAMMING

BACKGROUND OF THE INVENTION

A storage device may be communicatively coupled to a host and to non-volatile memory including, for example, a NAND flash memory device on which the storage device may store data received from the host. The memory device may include multiple dies which may be divided into physical blocks and the storage device may store data in blocks on the memory device. Data may be stored in the blocks in various formats, with the formats being defined by the number of bits that may be stored per memory cell. For example, a single-level cell (SLC) format may write one bit of information per memory cell, a multi-level cell (MLC) format may write two bits of information per memory cell, a triple-level cell (TLC) format may write three bits of information per memory cell, a quadruple-level cell (QLC) format may write four bits of information per memory cell, and so on.

The format used to store data on the memory device may determine how data is coded in the cells on the memory device. Unlike a SLC storage device with a single threshold voltage and a transistor that is either on or off, a QLC cell storage device may have sixteen possible voltage states in a voltage window. Data may be coded on a multi-bit cell based on different states of the memory cell and may be coded in a top page, an upper page, a middle page, and a lower page.

When a controller on the storage device sends data to the memory device for storage, the controller may use, for example, a Low-Density Parity Check (LDPC) encoder to protect the data with an LDPC code. The memory device may write the data to, for example, the sixteen voltage states in QLC memory cells using a foggy-fine programming operation which may include a first (foggy) programming operation and a second (fine) programming operation. With the foggy operation, the lower, middle, upper, and top pages may be programmed to first/approximate distributions. The first distributions may overlap and result in high bit-error-rates (BER), such that when the memory cells that are in the first distributions are read, a large number of errors may occur because of the overlaps.

To protect the data while in the foggy stage and enable its reading for a subsequent fine programming, one or two temporary parity pages may be calculated by exclusive ORing (XORing) the lower, middle, upper, and top pages in a voltage state. The parity page(s) may be stored in a data cache, for example, SLC memory on the memory device. For QLC memory cells with sixteen voltage states, when one parity page is calculated, the parity page may indicate whether a programmed state was even or odd. Adjacent states may not have the same parity. States with even parity may be assigned to a first/even category and states with odd parity may be assigned to a second/odd category. When two parity pages are calculated, the parity pages may indicate whether the programmed state modulo 4 is equal to 0/1/2/3 (i.e., the two parity bits may split the states into four categories). The parity page(s) may be used to distinguish between states in the same category and may enable large state separation.

Prior to the fine programming, the foggy pages may be read and decoded on the memory device using the parity pages. Any errors in the decoded foggy pages may result in "hard" errors that may be carried on in the fine programming. Hence, the memory device may ensure that the decoded foggy pages have a sufficiently low BER prior to the fine programming. In estimating the BER, the memory device may estimate the number of cells in an overlap region between first/foggy distributions. If the memory device determines that there are a number of cells in the overlap region, the memory device may send the data to the storage device for the data to be decoded with, for example, a LDPC decoder. After the data is decoded with the LDPC decoder, the storage device may send the data back to the memory device for fine programming. If the memory device determines that the BER is sufficiently low, the memory device may decode the foggy data with the parity page(s) and perform fine programming on the decoded foggy data.

SUMMARY OF THE INVENTION

In some implementations, a memory die may estimate a bit-error-rate (BER) for an encoded foggy program operation to determine whether to decode foggy programmed data on the memory die for a fine programming operation. The memory die may include blocks to store data in various formats. A memory controller on the die may receive data from a storage device and generate parity page(s) based on the data. The memory controller may perform a foggy program operation to write the data to memory cells in a block. The memory controller may separate states in a memory cell into categories based on a value of a parity page associated with a state. The memory controller may also perform soft bit sensing operations and estimate a BER for the memory cell based on the soft bit sensing operations. Based on the BER, the memory controller may perform on-die decoding of the foggy programmed data with the parity page(s) and write the decoded data to the block with a fine program operation.

In some implementations, a method is provided for estimating the BER for an encoded foggy program operation to determine whether to decode foggy programmed data on the memory die for a fine programming operation. The method includes receiving data from a storage device and generating parity page(s) based on the data. The method also includes performing a foggy program operation to write the data to memory cells in a block, separating states in a memory cell into categories based on a value of a parity page associated with a state, and performing soft bit sensing operations. The method further includes estimating a BER for the memory cell based on the soft bit sensing operations and based on the BER, performing on-die decoding of the foggy programmed data with the parity page(s). The method also includes writing the decoded data to the block with a fine program operation.

In some implementations, a method is provided for estimating a bit-error-rate (BER) for an encoded foggy program operation to determine whether to decode foggy programmed data on the memory die for a fine programming operation. The method includes receiving data from a storage device and generating at least one parity page based on the data. The method also includes performing a foggy program operation to write the data to memory cells in a block, separating states in a memory cell into categories based on a value of a parity page associated with a state, and performing soft bit sensing operations and generating a soft bit page. The method further includes estimating a BER for the memory cell based on the soft bit page. Based on the BER, the method includes performing on-die decoding of the foggy programmed data with the parity page(s) or determining that the foggy programmed data is to be transferred to the storage device for decoding. When the foggy programmed data is to be transferred to the storage device, the method includes transmitting the foggy programmed data and the soft bit page to the storage device, receiving decoded foggy programmed data from the storage device and writing the decoded foggy programmed data to the block with a fine program operation.

BRIEF DESCRIPTION OF THE DRAWINGS

FIG. 7 illustrates an example of an encoded recovery table that may be applied to a memory die coded according to the first transition in accordance with some implementations.

FIG. 9 is another example flow diagram for generating soft bit information for BER estimation of foggy programmed data in accordance with some implementations.

Figure 1:
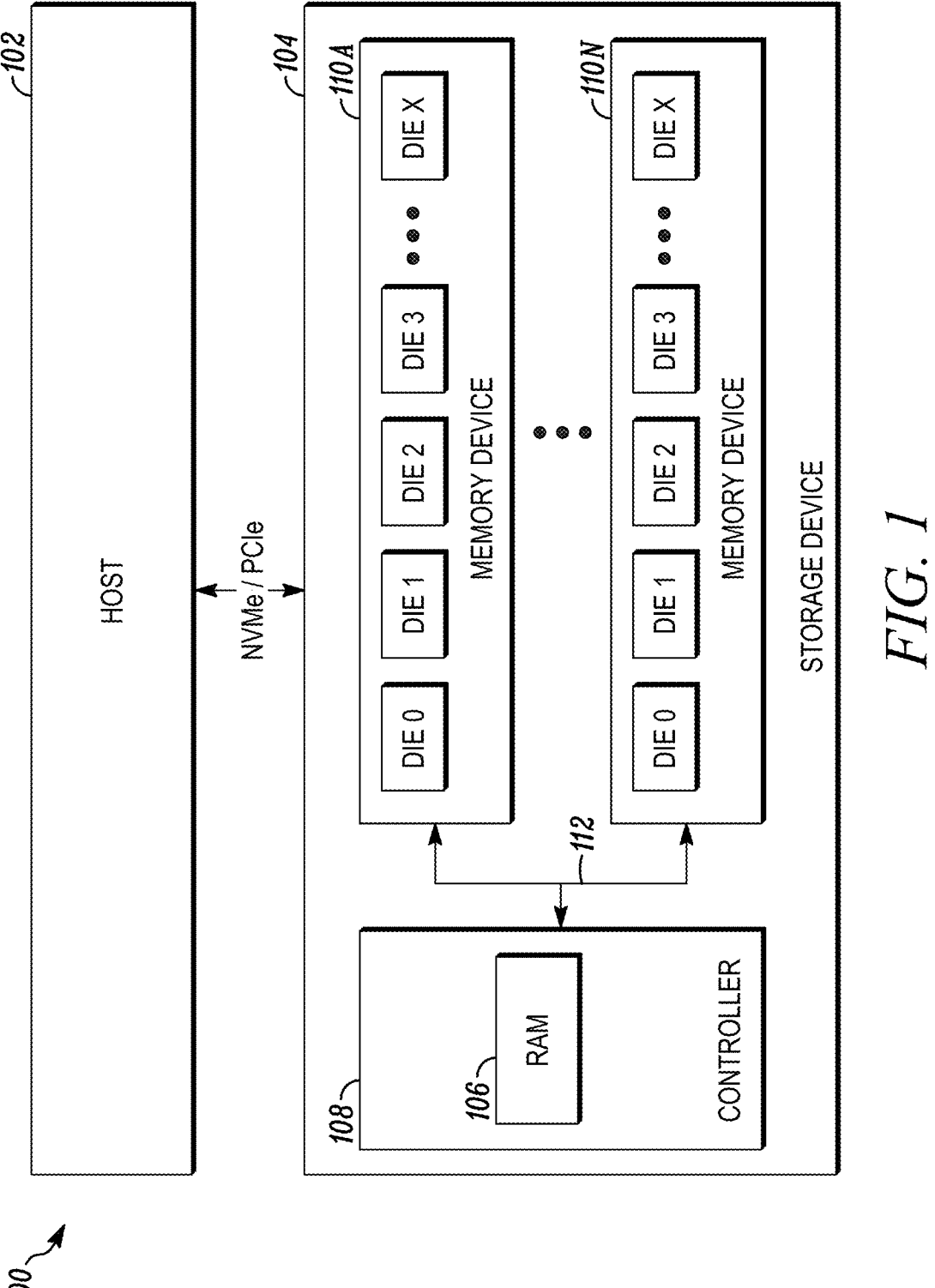
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various implementations, may be disposed in one or more different locations relative to the host 102 and storage device 104 may communicate with host 102 over a peripheral component interconnect express (PCIe) protocol and the like. Host 102 may include additional components (not shown in this figure for the sake of simplicity).

Storage device 104 may include a random-access memory (RAM) 106, a controller 108, one or more non-volatile memory devices 110a-110n (referred to herein as the memory device(s) 110). Storage device 104 may be, for example, a solid-state drive (SSD). RAM 106 may be static RAM (SRAM) or dynamic RAM (DRAM) that may be used to store information used on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may execute garbage collection, read refresh, and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include one or more dies (for example, DIE 0-DIE X) connected to a memory bus 112 including data lines and chip enable lines. Memory bus 112 may communicate with a toggle mode (TM) interface (not shown) to communicatively couple memory device 110 to controller 108. The dies may be divided into blocks to store the data and data may be stored in various formats, including, for example, SLC format, MLC format, TLC format, and/or QLC format. Memory device 110 may be included in storage device 104 or may be otherwise communicatively coupled to storage device 104. FIG. 1 is provided as an example. Other examples may differ from what is described in FIG. 1.

Figure 2:
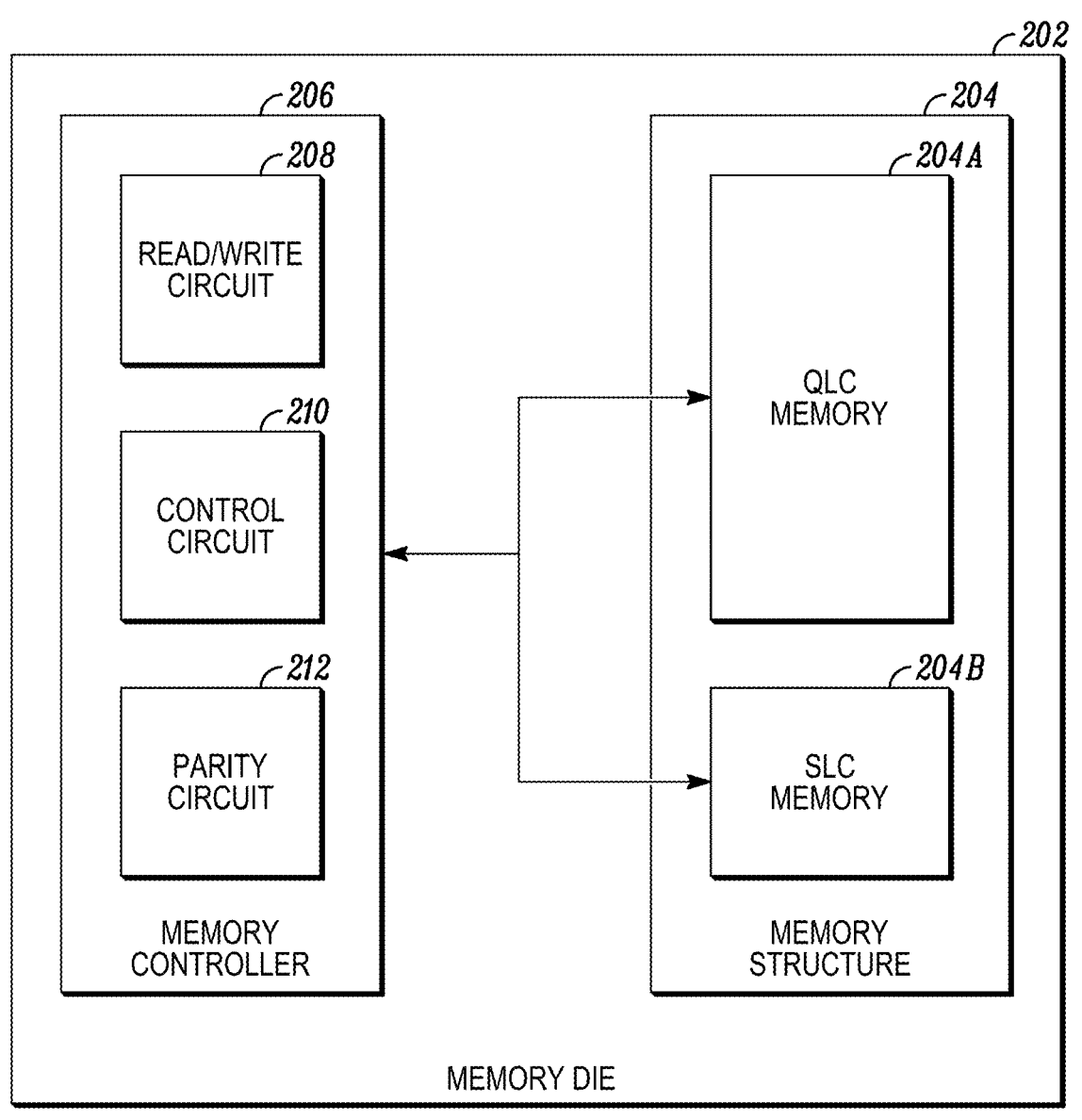
FIG. 2 is an example functional block diagram of a memory die in accordance with some implementations.

FIG. 2 is an example functional block diagram of a memory die in accordance with some implementations. Memory die 202 may include one or more memory structures 204 and a memory controller 206. Memory structures 204 may include configurable memory sections that may include blocks for storing data in a given format. For example, memory structures 204 may include a QLC memory 204a that may include a first set of blocks for storing data in a (first) QLC format and an SLC memory 204b that may include a second set of blocks for storing data in a (second) SLC format.

Memory controller 206 may include read/write circuits 208, a control circuit 210, and a parity circuit 212. Read/write circuit 206 may include sensing circuitry to enable a page of memory cells in memory structure 204 to be read or programmed in parallel. Control circuity 210 may provide die-level control of memory operations, control the power and voltages suppled to the word lines and bit lines during memory operations, and cooperate with read/write circuit 206 to perform memory operations on memory structure 204. Parity circuit 212 may generate one or more parity pages by exclusive ORing (XORing) the lower, middle, upper, and top pages in a voltage state. The parity page(s) may be used to protect the data in a foggy stage and enable its reading. The parity page(s) may be stored in a data cache, for example, SLC memory 204b until fine programming is initiated and the data resulting from the fine programming may be saved on QLC memory 204a. This may enable foggy-fine programming to be performed with a relatively lower volume of traffic on bus 112 between controller 108 and memory device 110. FIG. 2 is provided as an example. Other examples may differ from what is described in FIG. 2.

Figure 3:
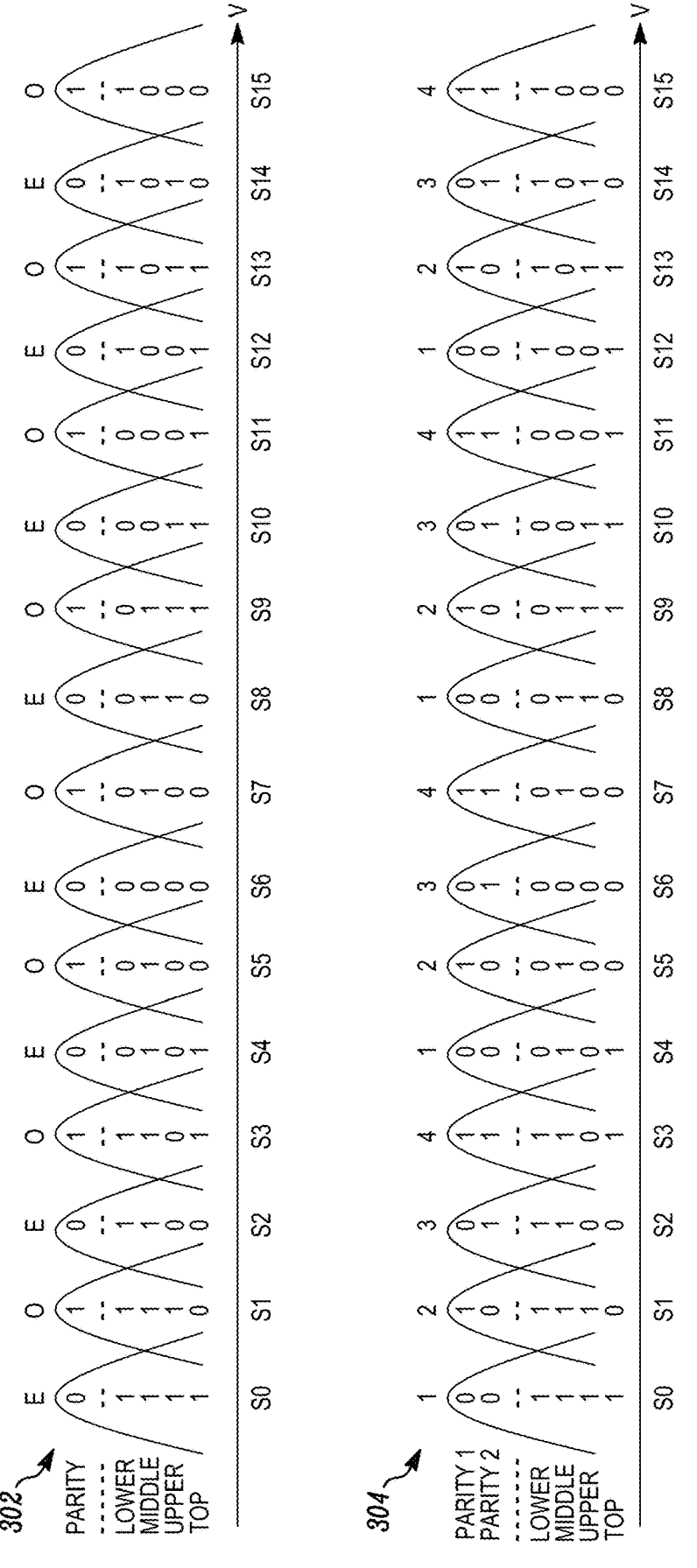
FIG. 3 illustrates an example of foggy programming of a group of QLC memory cells using sixteen distributions corresponding to sixteen data states and parity page(s) in accordance with some implementations.

FIG. 3 illustrates an example of foggy programming of a group of QLC memory cells using sixteen distributions corresponding to sixteen data states and parity page(s) in accordance with some implementations. 302 shows QLC memory cells with sixteen voltage states, wherein one parity page may be calculated to indicate whether a foggy programmed state was even or odd. Adjacent states (S) may not have the same parity. For example, S0 may have an even parity (for example, 0), S1 may have an odd parity (for example, 1), S2 may have an even parity, S3 may have an odd parity, and so on. States with even parity may be assigned to a first category and states with odd parity may be assigned to a second category. For example, states with even parity assigned to an even category are shown with E over the distribution) and states with odd parity assigned to an odd category are shown with O over the distribution.

304 shows QLC memory cells with sixteen voltage states, wherein two parity pages are calculated to indicate whether the programmed state modulo 4 is equal to 0/1/2/3 (i.e., the two parity bits may split the states into four categories). For example, the two parity pages may be used to assign the states into first, second, third, and fourth categories (shown with 1, 2, 3, 4 over the distributions) The parity page(s) may be used to distinguish between states in the same category and may enable large state separation between states in the same category. The parity page(s) may thus enable memory controller 206 to perform foggy data recovery. FIG. 3 is provided as an example. Other examples may differ from what is described in FIG. 3.

After foggy programming cells in QLC memory 204a as shown, for example, in 302 and 304, memory controller 206 may perform a low complexity BER estimation by counting the number of cells in the overlap region in each category as identified by its unique parity bit(s) value. Memory controller 206 may perform a soft bit (SB) read for the cells in each category. The SB read may include reading around the mid points between the states in each category. Memory controller 206 may generate a SB page from the SB read for each category. The number of zeros in the SB page may indicate how many cells have a threshold voltage in the overlap region and are prone to error. If the number of zeros in the SB page is below a predefined threshold, memory controller 206 may estimate the BER for the foggy pages to be low and may use the parity pages to decode the foggy pages for a fine write operation.

If the number of zeros in the SB page is at or above the predefined threshold, memory controller 206 may estimate the BER for the foggy pages to be high. Memory controller 206 may send the foggy pages to controller 108 for controller 108 to use, for example, a LDPC engine to decode the data, such that controller 108 may return "clean" pages to memory device 110 for fine programming. FIG. 3 is provided as an example. Other examples may differ from what is described in FIG. 3.

Figure 4:
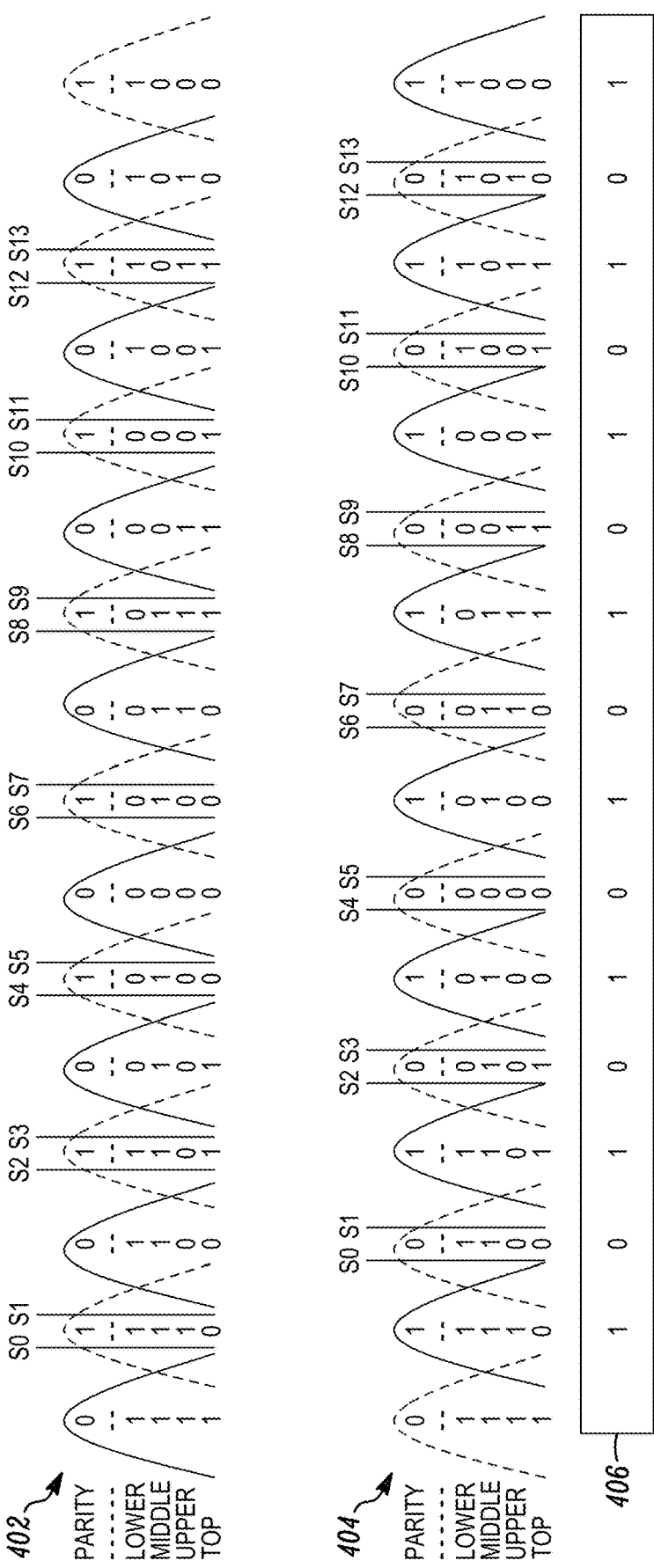
FIG. 4 illustrates an example of a soft bit read for BER estimation in accordance with some implementations.

FIG. 4 illustrates an example of a soft bit read for BER estimation in accordance with some implementations. 402 shows the states from 302 with an even parity and assigned to a first/even category and 404 shows the states from 302 with an odd parity and assigned to a second/odd category. The dashed lines in 402 are meant to show distributions that are not in the first/even category and the dashed lines in 404 are meant to show distributions that are not in the second/odd category. Taking, for example, the distributions in the even category in 402 and the odd category in 404, memory controller 206 may perform a sensing around the mid points between distributions/states in a category. For example, memory controller 206 may perform a sensing at sense s0-s13 at different voltage levels, wherein memory controller 206 may perform a sensing operation at s0, exclusive NOR (NXOR) the result with the sensing operation at s1, NXOR the result with the sensing operation at s2, NXOR the result with the sensing operation at s3, NXOR the result with the sensing operation at s4, and so on. Memory controller 206 may thus perform fourteen sensing operations to obtain an SB page for each category. The SB page may include, for example, sixteen kilobytes of cells, with each cell including the value of a soft bit. Memory controller 206 may store the results from the sensing operations in a latch.

406 shows a mapping of the SB page wherein the logical representation for the SB page shows a 1 in the region under each distribution and a 0 between the lines between two distributions. Based on the logical representation of the SB page, 0 may show the cell in a transition region. 406 shows the SB mapping and its size is the number of senses+1 (for example, 15 in the example of FIG. 3), wherein the SB page may usually be a 16 KB page, having one bit per cell in the Word Line, indicating whether the Vt of the cell is in the transition region between states ('0') or outside the transition region ("1"). Cells whose SB value is "0" are more prone to error (as their Vt is the transition between states) and hence the number of "0"'s in the SB page may be correlated to the Bit Error Rate (BER) of the Foggy page Memory controller 206 may count the number of zeros in the SB page in the latch. If the number of zeros is below the predefined threshold, memory controller 206 may determine that the BER is low and memory controller 206 may perform on-die decoding with the parity page(s) and continue to perform fine programming. In rare cases, the number of zeros in the SB page may be at or above the predefined threshold. In such cases, memory controller 206 may determine that the BER is high and memory controller 206 may send the foggy programmed pages to controller 108 for controller 108 to use a decoder to decode the data. After controller 108 decodes the data, controller 108 may return "clean" pages to memory device 110 for fine programming.

In a conventional sensing operation, a certain voltage may be put on a control gate and a check may be performed to determine whether or not current is flowing in the bit line. The check for determining whether current is flowing in the bit line may be done by waiting for some integration time and checking if the bit line capacitor goes down (i.e., current is flowing in the bit line). Memory controller 206 may place a certain value of the control gate voltage corresponding to s0, put a higher control gate voltage corresponding to s1, put a higher control gate voltage corresponding to s2 than the control gate voltage corresponding to s1, put a higher control gate voltage corresponding to s3 than the control gate voltage corresponding to s2, and so on. As such, each sensing operation may take more time to wait for the voltage to stabilize.

Memory controller 206 may perform a faster sensing operation of, for example, s0 and s1 with a single control gate voltage and modulate/change the integration time of the sense amplifier. Adjusting the integration time may mimic changing the control gate voltage. With the same control gate voltage, memory controller 206 may use two integration times to do the sensing of, for example, s0 and s1. Memory controller 206 may thus use integration time modulation instead of control gate voltage modulation for sensing at the transitions between states, assuming that the transition is not too large. With the faster sensing operation, memory controller 206 may perform the sensing operation within a shorter time. For example, using the faster sensing operation, memory controller 206 may perform the sensing operation for s0-s13 within a time period used for between seven to fourteen sensing operations with the conventional sensing operation. It should be noted that this approach may be applied to three-bit coding or four-bit coding if even a wider BER estimation is required. FIG. 4 is provided as an example. Other examples may differ from what is described in FIG. 4.

Figure 5:
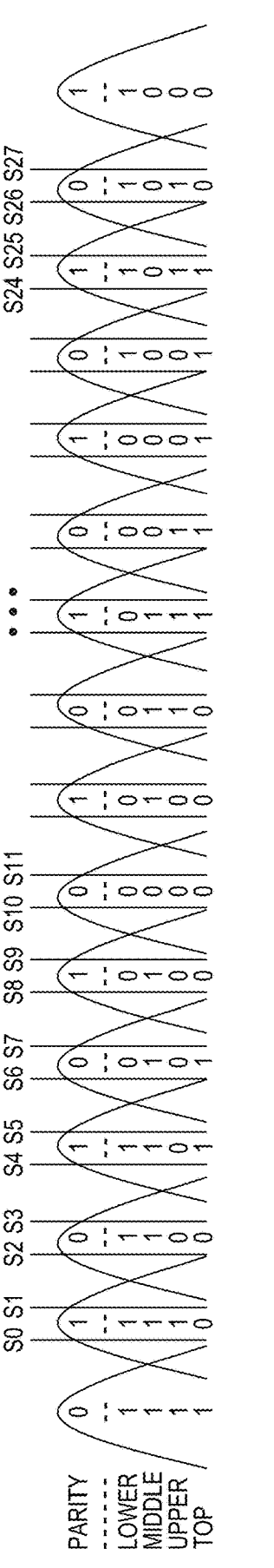
FIG. 5 illustrates another example of a soft bit read for BER estimation in accordance with some implementations.

FIG. 5 illustrates another example of a soft bit read for BER estimation in accordance with some implementations. Memory controller 206 may perform the foggy page read and the SB sensing within the same operation. As such, the SB sensing may be combined with the hard bit sensing used for reading the foggy pages. This may reduce the overall sense time by approximately thirty-seven percent compared to a separate hard bit sensing plus soft bit sensing. When the foggy page read and the SB sensing are performed within the same operation, memory controller 206 may also estimate the BER of multiple categories within a single sense operation, as shown in FIG. 5. For example, instead of the fourteen-sensing operation performed for estimating the BER for one category, as shown in 402 and 404, memory controller 206 may perform twenty-eight sensing operation to estimate the BER for the categories shown in 402 and 404. Memory controller 206 may use the parity bit to determine which sensing operations to NXOR together. For example, memory controller 206 may use the parity bit to determine that s0, s1, s4, s5, s8, s9, s12, s13, s16, s17, s20, s21, s24, s25 may be NXOR together and memory controller 206 may use the parity bit to determine that s2, s3, s6, s7, s10, s11, s14, s15, s18, s19, s22, s23, s26, s27 may be NXOR together. When memory controller 206 performs the sensing operation of s0, s1, s4, s5, s8, s9, s12, s13, s16, s17, s20, s21, s24, s25, memory controller 206 may store the sensing operation for the first category (i.e., s0, s1, s4, s5, s8, s9, s12, s13, s16, s17, s20, s21, s24, s25) into the latch for states where the parity bit is one. When memory controller 206 performs the sensing operation of s2, s3, s6, s7, s10, s11, s14, s15, s18, s19, s22, s23, s26, s27, memory controller 206 may store the sensing operation for the second category (i.e., s2, s3, s6, s7, s10, s11, s14, s15, s18, s19, s22, s23, s26, s27) into the latch for states where the parity bit is zero. At the end of the sensing operation, one SB page may include the number of cells in the transition regions of both categories and memory controller 206 may count the number of zeros in the SB latch and compare the number of zeros to a threshold to determine whether the BER is low enough to continue with fine programming after on-die decoding with the parity bit or whether the foggy data needs to be transferred out for decoding by controller 108.

In some implementations when memory controller 206 determines that the foggy data needs to be transferred out for decoding in storage device 104, memory controller 206 may send the SB page along with the foggy data to storage device 104. The decoder in storage device 104 may use the SB page as soft information to attach reliability to the foggy data and improve its error correction capabilities. For example, information in the SB page may be used to attach a high or low probability to a foggy bit in a given state. The high or low probability may indicate, for example, how close a foggy bit is to a transition between states. The decoder may thus use the SB reliability information to correct more errors.

In an implementation, parity circuit 212 may also generate enhanced foggy data that may be used to add more granularity in enabling memory controller 206 to separate states in a distribution. For example, the enhanced foggy data may be a red/green (RG) bit associated with a foggy distribution. The green bit may be used to determine when a distribution has shifted to the left and a red bit may be used to determine when a distribution has shifted to the right during data retention. The same RG bit may not be assigned to adjacent states. Parity circuit 212 may also generate other enhanced foggy data and the RG bit is only provided as an example. The parity page(s) and the RG bits for the first distributions may be stored in SLC memory 204b. Memory controller 206 may use the parity page(s) and the RG bits with an encoded recovery table to recover data from the first distributions shown, for example, in 302. FIG. 5 is provided as an example. Other examples may differ from what is described in FIG. 5.

Figure 6:
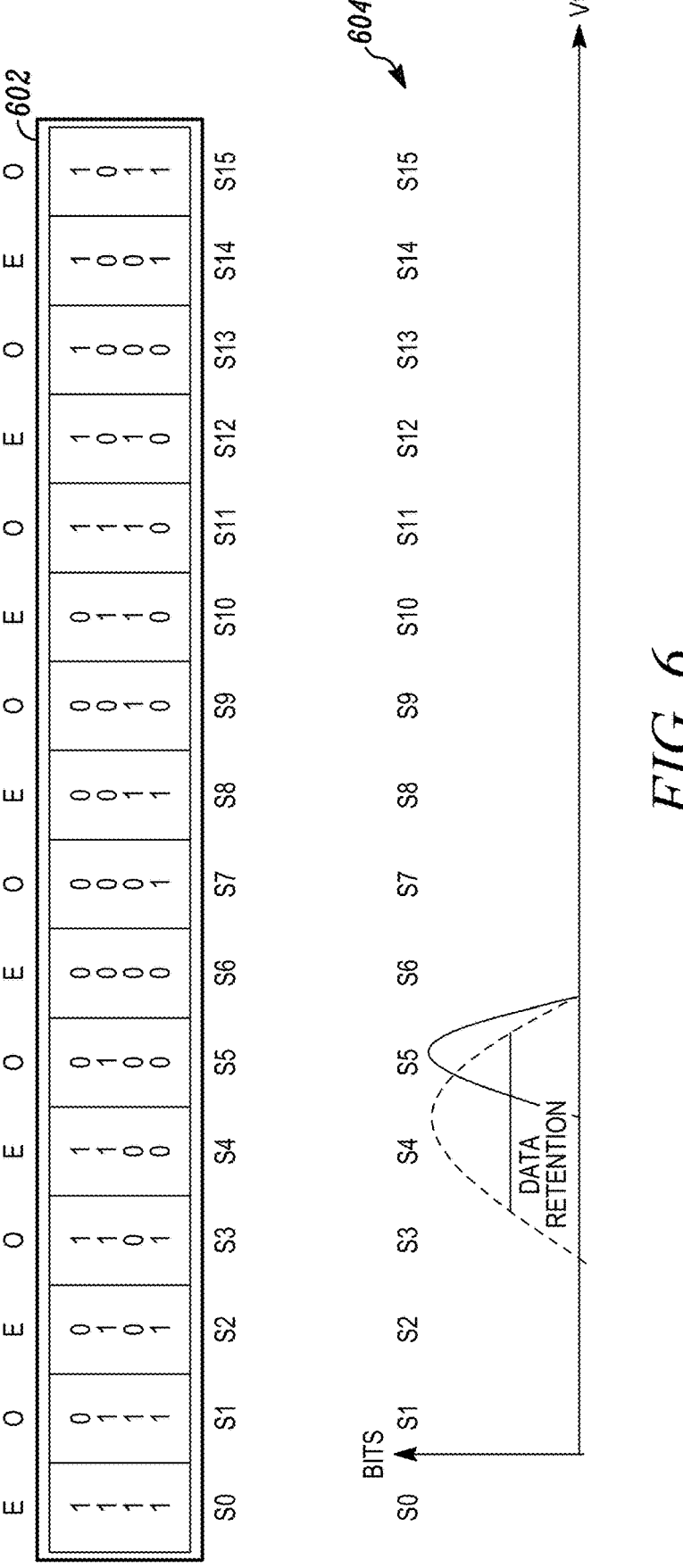
FIG. 6 illustrates an example of a memory die coded according to a first transition in accordance with some implementations.

FIG. 6 illustrates an example of a memory die coded according to a first transition in accordance with some implementations. The memory die may be coded such that there may be four transitions from 1 to 0 on the top row, three transitions from 1 to 0 on the next row, four transitions from 1 to 0 on the next row, and four transitions from 1 to 0 on the bottom row, as shown in 502. As such, the memory die may be coded using a first (i.e., 4344) transition. The memory die may be coded using other transitions and the 4344 transition is only provided as an example.

Adjacent states may have even or odd parity and be assigned to an even or odd category. For example, S1 may be assigned to an odd category (shown as O), S2 may be assigned to an even category (shown as E), S3 may be assigned to an odd category, S4 may be assigned to an even category, and so on. The green states may be S0, S1; S4,S5; S8,S9; S12,S13 and red states may be S2,S3; S6,S7; S10, S11; S14,S15. 604 shows an example where the foggy programmed distribution for state 5 (S5) may have shifted to the left beyond the adjacent state (i.e., beyond S4 into S3). The distribution for S5 is shown in 604 with a solid line and the distribution shift is shown with a dashed line. In 602, the foggy data written in S5 is 0100, the parity is odd, and the assigned bit is green.

During a foggy read, memory controller 206 may calculate the BER and generate the SB page. In some cases, prior to sending the data to storage device 104 for decoding because of a high BER, memory controller 206 may use the RG bit assigned to a distribution to determine if there is leftward or rightward shift. For example, if during a QLC read, memory controller 206 retrieves 1101 (i.e., the data from S3) because of the leftward shift, memory controller 206 may determine the RG bit assigned to S5 is green and the parity is odd. Memory controller 206 may determine that the distribution has shifted beyond the adjacent distribution because S3 and S5 are both assigned a green bit and odd parity. Memory controller 206 may use an encoded recovery table to recover the data. FIG. 6 is provided as an example. Other examples may differ from what is described in FIG. 6.

FIG. 7 illustrates an example of an encoded recovery table that may be applied to a memory die coded according to the first transition in accordance with some implementations. Entries in encoded recovery table 702 may be based on how a memory die is coded. Encoded recovery table 702 may include a green bit table 704 and a red bit table 706. Green bit table 704 may include an event column associated with an event (for example, the number of states in a distribution), a green column including retrieved bits that may be read from a state assigned a green bit, a parity column identifying an even or odd parity assigned to a state, and a recovered bit column including the recovered bits that may be programmed with fine programming. Red bit table 706 may also include an event column associated with an event, a red column including retrieved bits that may be read from a state assigned a red bit, a parity column identifying an even or odd parity assigned to a state, and a recovered bit column including the recovered bits that may be programmed with fine programming.

If the event in green bit table 704 or red bit table 706 is a zero, then no error (i.e., no shifting of a distribution) may have occurred. If the event is one, there may be a one state data retention shift (i.e., a distribution may have shifted to an adjacent state), if the event is two, there may be a two-state data retention shift (i.e., a distribution may have shifted beyond an adjacent state to the next state), and if the event is three, there may be a three-state data retention shift (i.e., a distribution may have shifted beyond an adjacent state to the next two states). When charge is added to nearby memory cells, the threshold voltages of previously programmed memory cells may increase so that the threshold voltage distributions may change in what may be referred to as "program disturb". The event in green bit table 704 or red bit table 706 may also be a one state program disturb (PD1), or a two-state program disturb (PD2).

Using recovery table 702 on a memory die coded according to a first transition, as shown in FIG. 6, if, for example, memory controller 206 retrieves 1101 when reading the data for S5 because the distribution have shifted to S3, memory controller 206 may determine that a green bit and an odd parity is assigned to both S3 and S5. Memory controller 206 may determine based on, for example, the parity page and/or RG bits assigned to S3 and S5, that the distribution for S5 has shifted over two states, i.e., the distribution for S5 has shifted beyond the adjacent distribution because S3 and S5 may have the same parity and RG bit. Using green bit table 704 and as shown in the shaded section, when the event is 2, the retrieved bits in the green column are 1101, and the parity is odd, memory controller 206 may recover bits from the recovered bit column (i.e., 0100) and program 0100 into S5 during fine programing operations.

In some cases, rather than transferring the foggy programmed data to storage device 104 when the BER is high and the foggy programmed data has shifted, memory controller 206 may use the recovery table, parity page(s) and RG bit, to recover the foggy programmed data. If memory controller 206 cannot recover the foggy programmed data with the recovery table, parity page(s) and RG bit and the BER is above the predefined threshold, memory controller 206 may transfer the data to storage device 104 for the data to be decoded. FIG. 7 is provided as an example. Other examples may differ from what is described in FIG. 7.

Figure 8:
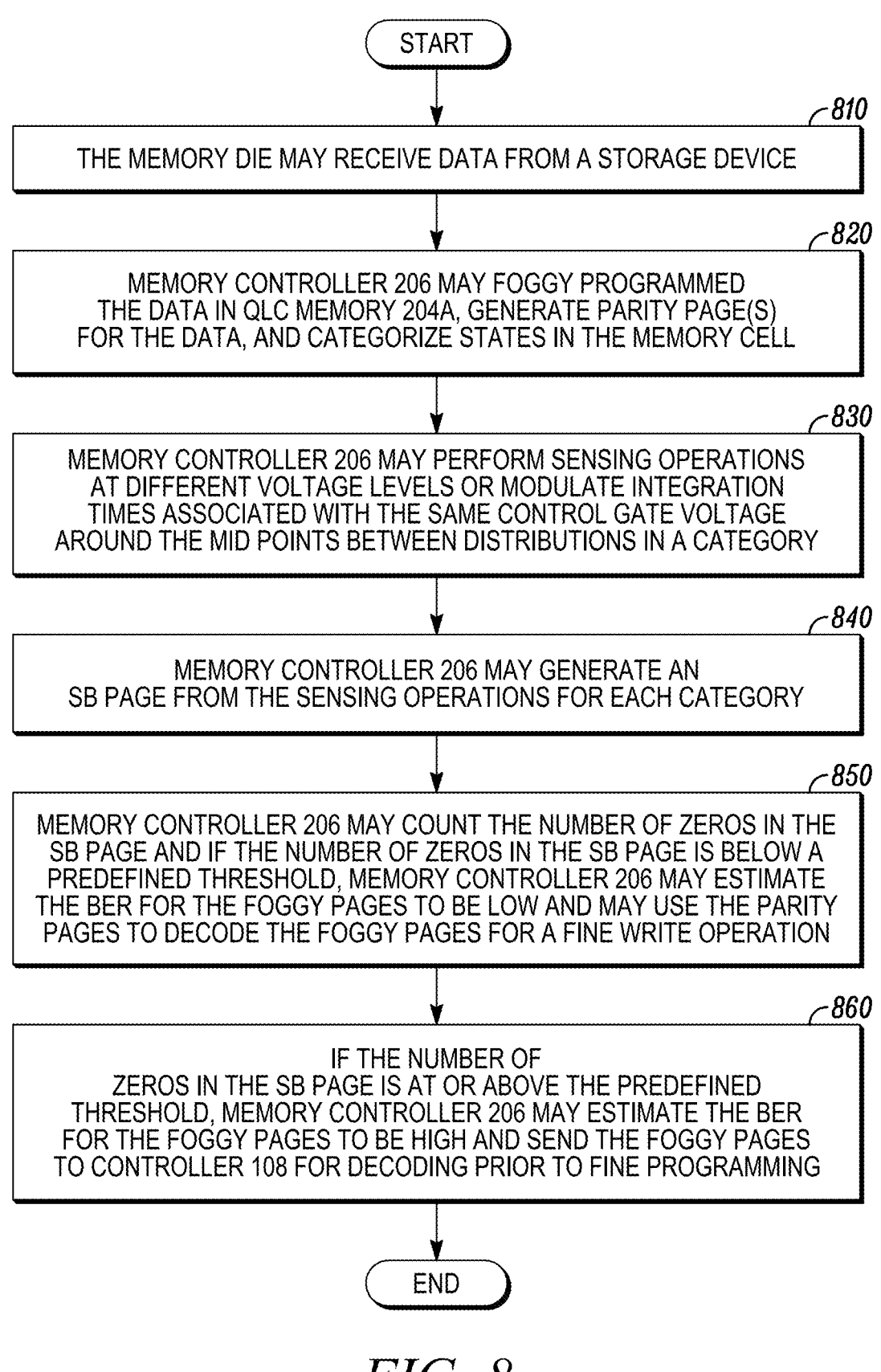
FIG. 8 is an example flow diagram for generating soft bit information for BER estimation of foggy programmed data in accordance with some implementations.

FIG. 8 is an example flow diagram for generating soft bit information for BER estimation of foggy programmed data in accordance with some implementations. At 810, the memory die may receive data from storage device 104 for storage. At 820, memory controller 206 may foggy programmed the data in QLC memory 204a, generate parity page(s) for the data, and categorize states in the memory cell. At 830, memory controller 206 may perform sensing operations at different voltage levels or modulate integration times associated with the same control gate voltage around the mid points between distributions in a category. At 840, memory controller 206 may generate an SB page from the sensing operations for each category. At 850, memory controller 206 may count the number of zeros in the SB page and if the number of zeros in the SB page is below a predefined threshold, memory controller 206 may estimate the BER for the foggy pages to be low and may use the parity pages to decode the foggy pages for a fine write operation. At 860, if the number of zeros in the SB page is at or above the predefined threshold, memory controller 206 may estimate the BER for the foggy pages to be high and send the foggy pages to controller 108 for decoding prior to fine programming. FIG. 8 is provided as an example. Other examples may differ from what is described in FIG. 8.

FIG. 9 is another example flow diagram for generating soft bit information for BER estimation of foggy programmed data in accordance with some implementations. At 910, the memory die may receive data from storage device 104 for storage. At 920, memory controller 206 may foggy programmed the data in QLC memory 204a, generate parity page(s) for the data, and categorize states in the memory cell. At 930, memory controller 206 may perform the foggy page read and the sensing operations at different voltage levels or modulated integration times associated with the same control gate voltage around the mid points between distributions in one or more categories within a single sense operation.

At 940, memory controller 206 may use the parity bit to determine which sensing operations to NXOR together and memory controller 206 may store the sensing operation for each category into a latch for cells having the same parity bit. At 950, at the end of the sensing operations, memory controller 206 may generate one SB page including the number of cells in the transition regions of multiple categories.

At 960, memory controller 206 may count the number of zeros in the SB page and if the number of zeros in the SB page is below a predefined threshold, memory controller 206 may estimate the BER for the foggy pages to be low and may use the parity pages to decode the foggy pages for a fine write operation. At 960, if the number of zeros in the SB page is at or above the predefined threshold, memory controller 206 may estimate the BER for the foggy pages to be high and send the foggy pages to controller 108 for decoding prior to fine programming. FIG. 9 is provided as an example. Other examples may differ from what is described in FIG. 9.

Figure 10:
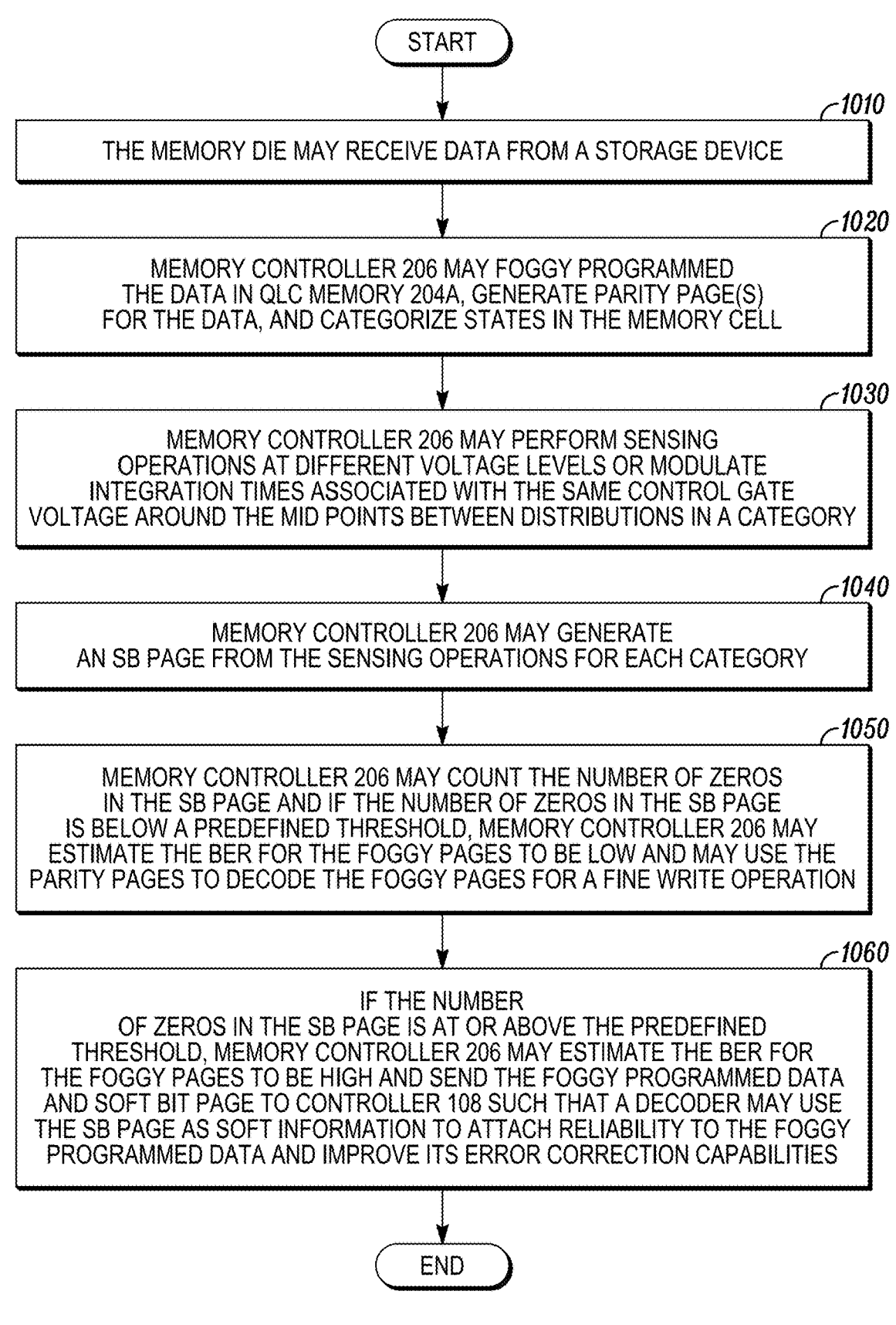
FIG. 10 is an example flow diagram for using soft bit information generated for BER estimation of foggy programmed data in accordance with some implementations.

FIG. 10 is an example flow diagram for using soft bit information generated for BER estimation of foggy programmed data in accordance with some implementations. At 1010, the memory die may receive data from storage device 104 for storage. At 1020, memory controller 206 may foggy programmed the data in QLC memory 204a, generate parity page(s) for the data, and categorize states in the memory cell. At 1030, memory controller 206 may perform sensing operations at different voltage levels or modulate integration times associated with the same control gate voltage around the mid points between distributions in a category. At 1040, memory controller 206 may generate an SB page from the sensing operations for each category. At 1050, memory controller 206 may count the number of zeros in the SB page and if the number of zeros in the SB page is below a predefined threshold, memory controller 206 may estimate the BER for the foggy pages to be low and may use the parity pages to decode the foggy pages for a fine write operation. At 1060, if the number of zeros in the SB page is at or above the predefined threshold, memory controller 206 may estimate the BER for the foggy pages to be high and send the foggy programmed data and soft bit page to controller 108 such that a decoder may use the SB page as soft information to attach reliability to the foggy programmed data and improve its error correction capabilities. FIG. 10 is provided as an example. Other examples may differ from what is described in FIG. 10.

11                                                    12

Figure 11:
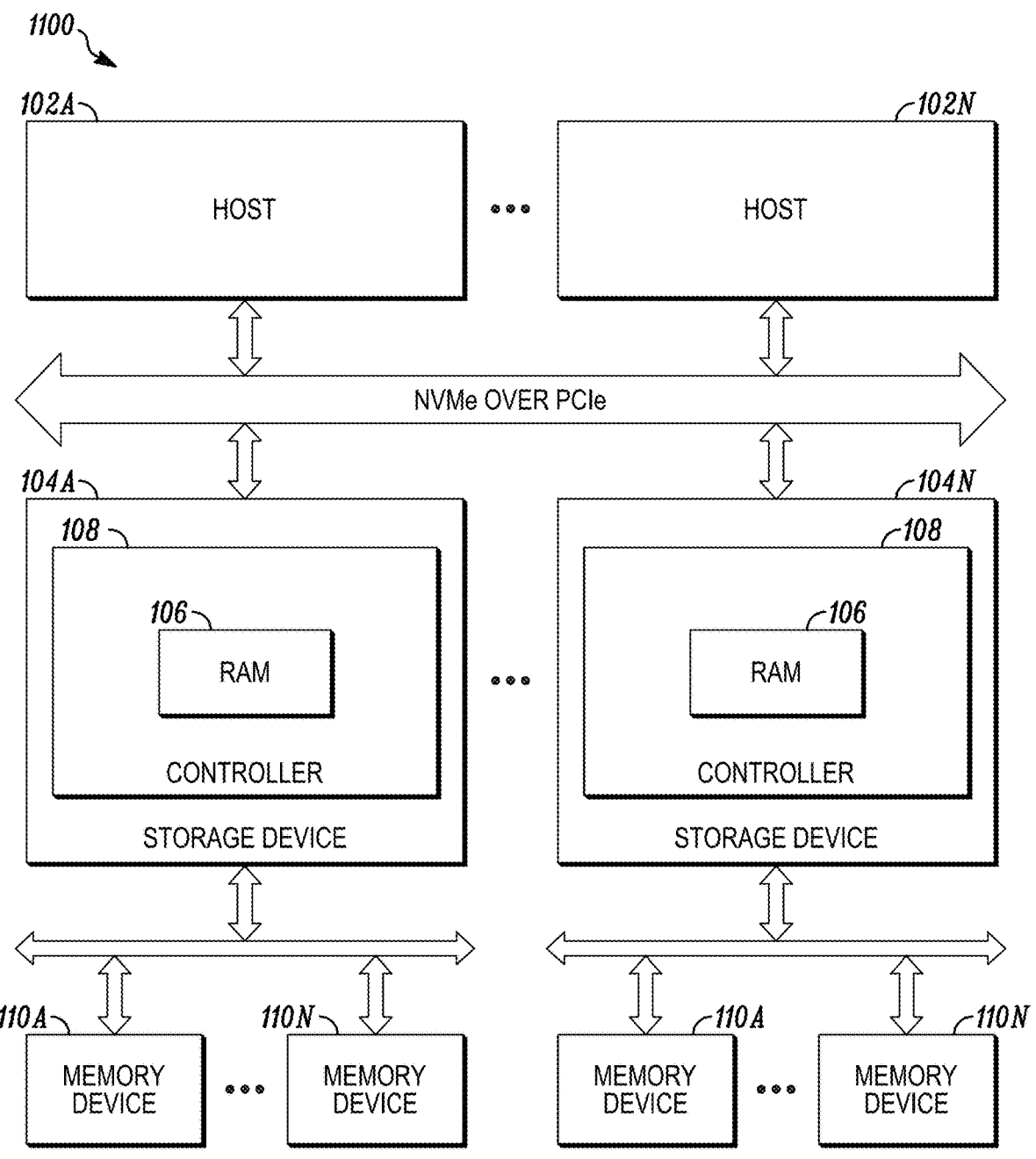
FIG. 11 is a diagram of an example environment in which systems and/or methods described herein are implemented.

FIG. 11 is a diagram of an example environment in which systems and/or methods described herein are implemented. As shown in FIG. 11, Environment 1100 may include hosts 102a-102n (referred to herein as host(s) 102), and one or more storage devices 104a-104n (referred to herein as storage device(s) 104). Memory device 110 may include a memory controller 206 to estimate the BER and implement the enhanced foggy-fine operations. Hosts 102 and storage devices 104 may communicate via Non-Volatile Memory Express (NVMe) over peripheral component interconnect express (PCI Express or PCIe), SD, or the like.

Devices of Environment 1100 may interconnect via wired connections, wireless connections, or a combination of wired and wireless connections. For example, the network in FIG. 11 may include NVMe over Fabric(NVMe-oF) Internet Small Computer Systems Interface(iSCSI), Fibre Channel (FC), Fibre Channel Over Ethernet (FCoE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of Environment 1100 may perform one or more functions described as being performed by another set of devices of Environment 1100.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A memory die to estimate a bit-error-rate (BER) for an encoded foggy program operation to determine whether to decode foggy programmed data on the memory die for a fine programming operation, the memory die comprises:

blocks to store data in various formats; and a memory controller to receive data from a storage device, generate at least one parity page based on the data, perform a foggy program operation to write the data to memory cells in a block, separate states in a memory cell into categories based on a value of a parity page associated with a state, perform soft bit sensing operations, estimate a BER for the memory cell based on the soft bit sensing operations, based on the BER, perform on-die decoding of the foggy programmed data with the at least one parity page, and write decoded data to the block with a fine program operation.

2. The memory die of claim 1, wherein the memory controller uses one parity page to indicate whether a foggy programmed state was one of even and odd and assigns foggy programmed states with a same parity page value to a category.

3. The memory die of claim 1, wherein the memory controller uses two parity pages to split foggy programmed states into four categories and assigns foggy programmed states with a same parity page value to a category.

4. The memory die of claim 1, wherein the memory controller uses a value of the at least one parity page to distinguish between states in the categories and to enable large state separation between states in a category.

5. The memory die of claim 1, wherein the soft bit sensing operations includes reading around midpoints between states in a category and generating a soft bit page for the category.

6. The memory die of claim 5, wherein the memory controller estimates the BER by counting a number of zeros in the soft bit page, wherein if the number is below a threshold, the memory controller performs the on-die decoding of the foggy programmed data.

7. The memory die of claim 5, wherein the memory controller estimates the BER by counting a number of zeros in the soft bit page, wherein if the number is above a threshold, the memory controller sends the foggy programmed data to the storage device for decoding.

8. The memory die of claim 1, wherein the soft bit sensing operations includes performing sense operations around midpoints between states at different voltage levels, performing exclusive NORs on results of the sense operations to generate a soft bit page, and storing the results of the sense operations on a latch.

9. The memory die of claim 1, wherein the soft bit sensing operations includes performing sense operations around midpoints between states with a single control gate voltage and modulated integration times, performing exclusive NORs on results of the sense operations to generate a soft bit page, and storing the results of the sense operations on a latch.

10. The memory die of claim 1, wherein the memory controller performs a foggy page read and soft bit sensing within an operation.

11. The memory die of claim 1, wherein the memory controller estimates the BER of multiple categories within a single sense operation, uses the at least one parity bit to determine which sensing operations to exclusive NOR, stores the soft bit sensing operation associated with one category into a latch for states with a same parity bit value, and generates one soft bit page including cells in transition regions of the multiple categories.

12. A method in a memory die for estimating a bit-error-rate (BER) for an encoded foggy program operation to determine whether to decode foggy programmed data on the memory die for a fine programming operation, the memory die comprises a controller to execute the method comprising:

receiving data from a storage device;
generating at least one parity page based on the data;
performing a foggy program operation to write the data to memory cells in a block;
separating states in a memory cell into categories based on a value of a parity page associated with a state;
performing soft bit sensing operations;
estimating a BER for the memory cell based on the soft bit sensing operations;
based on the BER, performing on-die decoding of the foggy programmed data with the at least one parity page; and
writing decoded data to the block with a fine program operation.

13. The method of claim 12, further comprising:
using one parity page to indicate whether a foggy programmed state was one of even and odd and assigning foggy programmed states with a same parity page value to a category; and using two parity pages to split foggy programmed states into four categories and assigning foggy programmed states with the same parity page value to one of the four categories.

14. The method of claim 12, wherein performing soft bit sensing operations includes reading around midpoints between states in a category and generating a soft bit page for the category.

15. The method of claim 14, wherein estimating the BER comprises counting a number of zeros in the soft bit page, wherein if the number is below a threshold, performing the on-die decoding of the foggy programmed data and if the number is above the threshold, sending the foggy programmed data to the storage device for decoding.

16. The method of claim 12, wherein performing soft bit sensing operations comprises one of:
performing sense operations around midpoints between states at different voltage levels, performing exclusive NORs on results of the sense operations to generate a soft bit page, and storing the results of the sense operations on a latch; and
performing sense operations around the midpoints between states with a single control gate voltage and modulated integration times, performing exclusive NORs on results of the sense operations to generate the soft bit page, and storing the results of the sense operations on the latch.

17. The method of claim 12, further comprising performing a foggy page read and soft bit sensing within an operation.

18. The method of claim 12, further comprising estimating the BER of multiple categories within a single sense operation, using the at least one parity bit to determine which sensing operations to exclusive NOR, storing the soft bit sensing operation associated with one category into a latch for states with a same parity bit value, and generating one soft bit page including cells in transition regions of the multiple categories.

19. A method in a memory die for estimating a bit-error-rate (BER) for an encoded foggy program operation to determine whether to decode foggy programmed data on the memory die for a fine programming operation, the memory die comprises a controller to execute the method comprising:

receiving data from a storage device;
generating at least one parity page based on the data;
performing a foggy program operation to write the data to memory cells in a block;
separating states in a memory cell into categories based on a value of a parity page associated with a state;
performing soft bit sensing operations and generating a soft bit page;
estimating a BER for the memory cell based on the soft bit page;
based on the BER, one of performing on-die decoding of the foggy programmed data with the at least one parity page and determining that the foggy programmed data is to be transferred to the storage device for decoding; and
when the foggy programmed data is to be transferred to the storage device, transmitting the foggy programmed data and the soft bit page to the storage device; receiving decoded foggy programmed data from the storage device; and writing the decoded foggy programmed data to the block with a fine program operation.

20. The method of claim 14, wherein when the soft bit page is transmitted to the storage device with the foggy programmed data, the soft bit page attaches reliability information to the foggy programmed data to improve error correction on the storage device.

* * * * *